(12) United States Patent
Hamasaki

(10) Patent No.: US 8,194,704 B2
(45) Date of Patent: Jun. 5, 2012

(54) NETWORK EQUIPMENT

(75) Inventor: Motoshi Hamasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 145 days.

(21) Appl. No.: 12/564,389

(22) Filed: Sep. 22, 2009

(65) Prior Publication Data

US 2010/0008384 A1    Jan. 14, 2010

Related U.S. Application Data

(63) Continuation of application No. PCT/JP2007/056954, filed on Mar. 29, 2007.

(51) Int. Cl.
*H04J 3/06* (2006.01)
(52) U.S. Cl. ........................................ 370/503
(58) Field of Classification Search ............ 370/464, 370/498, 503, 509, 510, 516; 375/354, 371, 375/373, 376
See application file for complete search history.

(56) References Cited

U.S. PATENT DOCUMENTS

| 6,980,568 | B1 * | 12/2005 | Reynov et al. | 370/503 |
| 7,613,212 | B1 * | 11/2009 | Raz et al. | 370/510 |
| 2002/0114416 | A1 * | 8/2002 | Enam et al. | 375/373 |
| 2004/0213282 | A1 * | 10/2004 | Kirk et al. | 370/458 |
| 2005/0138455 | A1 * | 6/2005 | Loukianov et al. | 713/400 |

FOREIGN PATENT DOCUMENTS

| JP | 7-30569 | 1/1995 |
| JP | 9-219687 | 8/1997 |
| JP | 2004-356843 | 12/2004 |

OTHER PUBLICATIONS

International Search Report dated Jun. 5, 2007, from the corresponding International Application.

* cited by examiner

*Primary Examiner* — Chi Pham
*Assistant Examiner* — Robert Lopata
(74) *Attorney, Agent, or Firm* — Katten Muchin Rosenman LLP

(57) ABSTRACT

A network equipment (element) is provided with at least one SDH unit, connected to an SDH link or SONET link, extracting and outputting a first line clock synchronized with a received signal; at least one Ethernet unit, connected to an Ethernet link, extracting a second line clock synchronized with a received signal and converting the second line clock into a clock of a frequency of the first line clock to be outputted; and a timing processor receiving the clocks of the frequency of the first line clock from the SDH unit and the Ethernet unit, selecting among the clocks a clock of the best quality and outputting an equipment clock synchronized with the clock selected.

8 Claims, 12 Drawing Sheets

NETWORK EQUIPMENT

CROSS-REFERENCE TO RELATED APPLICATION

This application is a continuation of International Application PCT/JP2007/56954 filed on Mar. 29, 2007, the contents of which are herein wholly incorporated by reference.

FIELD OF ART

The present invention relates to a network equipment (element) particularly having an Ethernet (registered trademark) switch connected to an Ethernet network or link.

BACKGROUND ART

In the current Ethernet network or link (hereinafter, occasionally referred to simply as Ethernet), network equipments forming the Ethernet are operated with mutually independent clocks. Accordingly, network equipments on the Ethernet naturally transmit/receive data to/from network equipments on an SDH (Synchronous Digital Hierarchy) or SONET (Synchronous Optical Network) (hereinafter, generally represented by SDH) network or link with mutually independent clocks.

FIG. 11 depicts a related art network equipment used in an SDH link or Ethernet. This network equipment NE corresponds to e.g. a network equipment NE2 in a network configuration example as depicted in FIG. 1, in which taking the example of FIG. 1, an SDH unit SU#1 that is a line interface unit LIU is connected to an SDH unit (not depicted) in a network equipment NE1; an SDH unit SU#2 is connected to an SDH unit (not depicted) in a network equipment NE4; and Ethernet units EU#1 and EU#2 (hereinafter, occasionally referred to as a reference symbol EU) forming a line interface unit LIU are connected to an Ethernet unit (not depicted) in e.g. network terminal equipments NTE1 and NTE2.

Then, the SDH unit SU#1 receives a signal having a line clock speed of e.g. 155.52 MHz (for STM1) (or 622.04 MHz (for STM4) or 2488.16 MHz (for STM16)) from the network equipment NE1, in which a frequency divider FD divides the frequency of the received signal at a ratio of 1/8 to generate line clocks LCLw and LCLp of 19.4 MHz to be transmitted to timing processors TC (W) and TC (P).

It is to be noted that "W" indicates a working side and "P" indicates a protection side, so that hereinafter the line clocks LCLw and LCLp may be generally referred to as a line clock LCL and the timing processors TC (W) and TC (P) may also be generally referred to as a timing processor TC.

The SDH unit SU#2 connected to the network equipment NE4 generates a line clock LCL as with the above SDH unit SU#1 to be transmitted to the timing processor TC.

The working and protection timing processors TC have a function of selecting a clock of the best quality among the line clocks LCL [19.44 MHz] transmitted from the SDH units SU#1 and SU#2 (hereinafter, occasionally referred to as a reference symbol SU), respectively generating equipment (element) clocks ECLw and ECLp (hereinafter, occasionally referred to as a reference symbol ECL) of 38.88 MHz forming a master clock for overall network equipments NE, synchronized with the selected clock at a phase locked loop portion PLL1 to be distributed to the SDH units SU#1 and SU#2, where the equipment clocks ECLw and ECLp are respectively provided to packet switches SW (W) and SW (P) as well. The SDH unit SU converts the equipment clock [38.88 MHz] into the line clock of 155.52 MHz at a phase locked loop portion PLL2 and outputs a transmission signal based on the line clock.

The above selection of the clock quality is determined based on SSM (Synchronization Status Message) that is a data indicating the quality transmitted through serial buses SB (W) and SB (P) (hereinafter, occasionally referred to as a reference symbol SB) interconnecting the SDH units SU#1 and SU#2 and connecting the SDH units SU#1 and SU#2 to the timing processors TC (W) and TC (P), respectively.

On the other hand, the Ethernet unit EU transmits/receives a signal to/from the network terminal equipments NTE1 and NTE2 at a line clock speed of 125 MHz (for FE) (or 1.25 GHz (for GbE) or 12.5 GHz (for 10 GbE)).

An arrangement of the above Ethernet unit EU depicted in FIG. 11 is depicted in FIG. 12. This Ethernet unit EU is composed of an interface portion IF formed of an optical module or the like and connected to an external portion, a physical layer processor PHY performing a physical layer processing for a received signal from an external Ethernet and performing a physical layer processing for a transmission signal such as transmitting a signal synchronized with a free-running transmission clock [125 MHz] from a transmission clock generator SGC, a packet processor PP connected to a packet switch SW through a main signal transmission line ML and performing a normal packet processing such as QoS (Quality of Service) processing for a packet and an OAM processor OP performing a processing of OAM (Operations Administration and Maintenance) packet obtained by the packet processor PP.

Thus, the Ethernet unit EU does not have a particular function for a clock synchronization, so that the signal transmission is made with a free-running clock. Therefore, the data transmission/reception between the SDH unit SU and the Ethernet unit EU is made asynchronously through routes not depicted.

As a reference art, there is a branch line LAN station connected to a trunk line LAN station, in which a clock recovery section extracts and recovers a clock from a reception signal from an upstream station; a decoder detects a symbol specific to the branch line LAN or the trunk line LAN based on serial/parallel conversion data with respect to the reception signal; a microprocessor discriminates an upstream station based on the result of detection; when the upstream station is the branch line LAN station and a concerned station is a master station, an output of an oscillator is used, when not the master station, a recovered clock is used and when the upstream station is the trunk line LAN station, the recovery clock is used for selection control as a master clock (see e.g. Japanese Laid-open Patent Publication No. 07-30569).

As a further reference art, there is a device, in which plural shelves have internal buses mounting and connecting plural units and connectors connected with both ends of these internal buses; a cascade connection is performed for the shelves for a master shelf by cables; by the timing control part of the master shelf, the extraction timing signal from the line stored in the master shelf; and an external timing signal and the extraction timing signal setting priority are selected based on a synchronizing state notification byte such as an S1 byte, etc. to generate a reference clock signal (see e.g. Japanese Laid-open Patent Publication No. 09-219687).

DISCLOSURE OF THE INVENTION

Problem to be Solved by the Invention

Thus, the network equipments on the Ethernet (link or network) are operated with mutually independent clocks, so that ITU-T Recommendation G.8261 prescribes a realization of a synchronization network on the Ethernet.

ITU-T is now standardizing a network synchronization with Ethernet, where the above Recommendation G.8261 corresponds to the standards, where the current Ethernet synchronization is mentioned as follows:
1) Packet Based Method;
2) Plesiochronous and Network Synchronous Method.

However, they do not explicitly specify the implementation, which is a problem to solved.

It is accordingly an object of the present invention to provide a network equipment used for realizing a synchronized network on Ethernet networks or links.

Means for Solving the Problem

In order to solve the above object, a network equipment according to the present invention comprises: at least one first unit, connected to an SDH link or SONET link, extracting and outputting a first line clock synchronized with a received signal; at least one second unit, connected to an Ethernet link, extracting a second line clock synchronized with a received signal and converting the second line clock into a clock of a frequency of the first line clock to be outputted; and a third unit receiving the clocks of the frequency of the first line clock from the first and the second units, selecting among the clocks a clock of the best quality and outputting an equipment clock synchronized with the clock selected; wherein the first unit outputs a transmission signal synchronized with the equipment clock and the second unit converts the equipment clock into a clock of a frequency of the second line clock to output a transmission signal synchronized with the clock converted.

Namely, when a network equipment intervenes between an SDH link and an Ethernet link, a third unit (e.g. timing processor) receives a first line clock synchronized with a received signal outputted from a first unit (e.g. SDH unit) and a clock of the frequency of the first line clock obtained by a second unit (e.g. Ethernet unit) from a second line clock synchronized with a received signal from the Ethernet link, selects a clock of the best quality among the clocks received and provides a clock synchronized with the clock selected to the first and the second units as a network equipment clock. Then, the first unit outputs a transmission signal synchronized with the network equipment and the second unit converts the network equipment clock into a clock of the frequency of the second line clock and outputs a transmission signal synchronized therewith.

Thus, line clocks from the first unit connected to the SDH link and the second unit connected to the Ethernet link are generated, so that a common network equipment clock synchronized with the best quality clock among the clocks is generated and provided to the first and the second units, thereby realizing a synchronized network between the SDH link and the Ethernet link.

Also, in order to solve the above object, a network equipment according to the present invention may comprise: at least one first unit, connected to an SDH link or SONET link, extracting and outputting a first line clock synchronized with a received signal; at least one second unit, connected to an Ethernet link, extracting and outputting a second line clock synchronized with a received signal; and a third unit receiving the first and the second line clocks respectively from the first and the second units, selecting among the line clocks a clock of the best quality and outputting a first and a second equipment clock synchronized with the clock selected; wherein the first unit outputs a transmission signal synchronized with the first equipment clock and the second unit outputs a transmission signal synchronized with the second equipment clock.

Namely, in this case, to the third unit the first unit provides a line clock of the SDH link or network and the second unit provides a line clock of the Ethernet link or network. Then, the third unit selects a clock of the best quality among the line clocks from the first and the second units, generates a network equipment clock of the SDH link or network and a network equipment clock of the Ethernet link or network based on the selected clock and distributes them to the first and the second units, respectively.

Hence, in this network equipment, without frequency conversions, the unit of the SDH link or network can only employ the clock of the SDH link or network while the unit of the Ethernet link or network can only employ the clock of the Ethernet link or network.

The above third unit may frequency-divide the first and the second line clocks into a clock of a common frequency and then select the clock of the best quality.

It is to be noted that the first and the second units may extract SSM (Synchronization Status Message) from the received signal to be transmitted to the third unit, the third unit selecting the clock of the best quality based on the SSM.

The above first and the second units respectively may comprise an SDH unit and an Ethernet unit connected one on one to a unit opposed through each link.

Furthermore, a network equipment according to the present invention may comprise: a plurality of first units, connected to an Ethernet link, extracting a first line clock synchronized with a received signal and converting the first line clock into a clock of a frequency of a second line clock to be outputted; and a second unit receiving the clocks of the frequency of the second line clock from the first unit, selecting among the clocks a clock of the best quality and outputting an equipment clock synchronized with the clock selected, by using a master clock; wherein the first units convert the equipment clock into the clock of the frequency of the first line clock and output a transmission signal synchronized with the clock converted.

Namely, the network equipment of this case is not a network equipment interconnecting the SDH link and the Ethernet link, different from the above network equipment but is composed of units each for the Ethernet link or network, in which the units of the Ethernet link or network have only to be substituted for the units the above noted SDH link or network, thereby realizing a synchronized network of the Ethernet link or network alone, where since the network equipment is of the SDH link or network, the Ethernet unit can be easily replaced by the SDH unit, thereby realizing a synchronization between the SDH link and the Ethernet link as well The first unit of this case may extract the SSM from the received signal to be transmitted to the second unit and the second unit selects the clock of the best quality based on the SSM, and may be connected one on one to a unit opposed through the Ethernet link.

It is to be noted that the above mentioned first line clock may comprise a line clock extracted from the received signal or a clock obtained by frequency-dividing the line clock extracted.

Effect of the Invention

As above described, according to the network equipment of the present invention, upon realizing an Ethernet synchronization a synchronization between SDH link or network and Ethernet link or network is enabled. It is also made possible to transmit a clock quality by SSM performed in the conventional SDH link, enabling the clock quality of the network to be reserved and the application of the function of the Ethernet synchronization to the SDH link to be easily made.

Furthermore, it becomes possible to realize a network equipment not requiring a frequency conversion upon realizing the Ethernet synchronization.

BEST MODE FOR IMPLEMENTING THE INVENTION

Embodiment 1

FIGS. 1-6

FIG. 1 depicts a network arrangement (1) for a network equipment (element) according to the present invention, in which network equipments NE1-NE4 form an SDH link SL, where the network equipment NE1 is supplied with a master clock PRC.

The network equipment NE2 corresponding to an embodiment of the network equipment according to the present invention is also connected to an Ethernet link (FE/GbE) EL in addition to the SDH link SL, the Ethernet link EL being connected to network terminal equipments NTE1-NTE5.

FIG. 2 depicts a network arrangement (2) to which the network equipment according to the present invention is applied, in which network equipments NE5-NE8 form an SDH link SL1, where the network equipment NE5 is supplied with the master clock PRC. Also, network equipments NE9-NE12 form another SDH link SL2.

These SDH links SL1 and SL2 are mutually connected with the Ethernet link EL (FE/GbE/10 GbE), where the network equipments NE6 and NE9 sandwiching the Ethernet link EL correspond to the network equipment according to the present invention.

One embodiment of the network equipment NE2 depicted in FIG. 1 and the network equipments NE6 and NE9 depicted in FIG. 2 is depicted in FIG. 3, generally referred to as a network equipment NE. The network equipment NE depicted in FIG. 3 is different from the related art network equipment depicted in FIG. 11 in that the Ethernet unit EU also has transmitting/receiving routes of the line clock LCL and the equipment clock ECL set with the timing processor TC and has connected thereto the serial buses SB. It is needless to say that while the example of FIG. 3 only depicts the Ethernet units EU#1 and EU#2 as the Ethernet unit EU, various Ethernet units may be included.

Namely, in the network arrangement (1) depicted in FIG. 1, the Ethernet unit EU#1 for example is connected to an Ethernet unit in the network terminal equipment NTE1 and the Ethernet unit EU#2 is connected to an Ethernet unit in the network terminal equipment NTE2. Also in the network arrangement (2) depicted in FIG. 2, the Ethernet unit EU#1 in the network equipment NE6 is connected to the Ethernet unit EU#1 in the network equipment NE9 and the Ethernet unit EU#2 is not connected to any portions.

The Ethernet unit EU receives a signal having the line clock speed of 125 MHz (for FE) from the Ethernet link EL. This Ethernet unit EU extracts the line clock of 125 MHz from the received signal and frequency converts the extracted line clock into the line clock LCLw of 19.44 MHz that is a clock frequency of the SDH network or link to be supplied to the timing processor TC (W). Similarly, from the Ethernet unit EU the line clock LCLp is supplied to the timing processor TC (P) as well. It is to be noted that the line clocks LCLw and LCLp may be the line clock per se inputted to the Ethernet unit EU.

While the timing processor TC supplies the equipment clock ECLw of 38.88 MHz to the SDH unit SU as also described in the related art of FIG. 11, the timing processor TC similarly supplies the equipment clock ECLw to the Ethernet unit EU. The equipment clock ECLp outputted from the timing processor TC (P) is similarly supplied to the Ethernet unit EU.

Furthermore, the serial bus SB (W) interconnecting the SDH unit SU and the timing processor TC (W) is also connected in common to the Ethernet units EU, and similarly the serial bus SB (P) mutually connecting the SDH unit SU and the timing processor TC (P) is also connected in common to the Ethernet units EU.

The Ethernet units EU having received the equipment clocks ECLw and ECLp convert them into a clock having the line clock speed (frequency) [125 MHz] of the Ethernet link, where the main signal is transmitted with this clock.

The timing processor TC receives the line clock LCL [19.44 MHz] from the SDH unit SU and Ethernet units EU, where the timing processor TC determines which line clock has the best clock quality based on data (SSM: depicted by dot-dash lines) indicating a clock quality transmitted from the SDH unit SU and the Ethernet units EU through the serial bus SB, selects the best quality among them and generates the equipment clock ELC phase-lock looped with the clock selected. This state is schematically depicted in FIG. 4.

FIG. 5 depicts one embodiment of the Ethernet unit EU depicted in FIGS. 3 and 4. In this embodiment, the Ethernet unit EU is different from the related art depicted in FIG. 12 in that there are provided in a clock part or route in addition to the related art depicted in FIG. 12 a reception clock converter RCC extracting a clock [125 MHz] of the Ethernet link or network from the physical layer processor PHY and converting it into a clock of the line clock frequency [19.44 MHz] of the SDH link or network, transmission clock converter SCC converting the equipment clock [38.88 MHz] of the SDH link or network provided by the timing processor TC into a clock of a frequency [25 MHz] of the Ethernet link or network and a transmission clock synchronizer SCS dividing the frequency-converted clock of 25 MHz into a clock [125 MHz] of the Ethernet link or network. Also they are different in that an OAM processor OP is connected to an SSM processor SP to transmit clock quality data (SSM) to the timing processor TC through the serial bus SB.

The reception clock converter RCC frequency-converts the clock of 125 MHz extracted at the physical layer processor PHY into the line clock of 19.44 MHz by using a synthesizer or the like, where in this embodiment the frequency conversion is made from the speed (frequency) (generally 125 MHz) of the Ethernet network or link to 1/n of the main signal speed (frequency) (m (m=1, 2, 4, 16 . . . ) times of 155.52 MHz) of the SDH link or network. This is because 1/n of 125 MHz does not correspond to 1/n of the signal speed of the SDH link or network. By sending the line clock of 19.44 MHz to the timing processor TC, the clock frequency received from all of the units SU and EU at the timing processor TC assumes 19.44 MHz.

Therefore, it becomes possible to use the timing processor TC having been used in the related art SDH link or network for the one in this embodiment.

The transmission clock converter SCC frequency-converts the clock of 38.88 MHz transmitted from the timing processor TC into a clock of 25 MHz that is the signal speed (frequency) of the Ethernet link or network by similarly using a synthesizer or the like, whereby the timing processor TC only has to transmit the clock of 38.88 MHz of the SDH link or network to all of the units SU and EU.

Therefore, it becomes possible to use the timing processor TC having been used in the related art SDH link or system for the timing processor TC concerned in this embodiment as well. The transmission clock synchronizer SCS frequency-divides the clock [25 MHz] outputted from the reception clock converter SCC into a clock of 125 MHz, which is transferred to the physical layer processor PHY, whereby the physical layer processor PHY will output a transmission signal with this clock.

The SSM data indicating the above-mentioned clock quality will now be described, where this SSM is composed of 4 bits as depicted in the following table 1:

TABLE 1

| SSM CODE [MSB...LSB] | QUALITY LEVEL |
|---|---|
| 0000 | QL-INV0 |
| 0001 | QL-INV1 |
| 0010 | QL-PRC |
| 0011 | QL-INV3 |
| 0100 | QL-SSU-A |
| 0101 | QL-INV5 |
| 0110 | QL-INV6 |
| 0111 | QL-INV7 |
| 1000 | QL-SSU-B |
| 1001 | QL-INV9 |
| 1010 | QL-INV10 |
| 1011 | QL-SEC |

The priority of quality levels depicted in the above table 1 is defined as depicted in the following table 2:

TABLE 2

| QUALITY LEVEL | PRIORITY |
|---|---|
| QL-PRC | High |
| QL-SSU-A | ↓ |
| QL-SSU-B | ↓ |
| QL-SEC | ↓ |
| QL-DNU, QL-INVn | Low |

(n = 0~14)

The timing processor TC collects the SSM information from the units SU and EU through the serial bus SB and selects from the value an input clock from a unit having received the SSM information indicating a clock of the highest quality level to generate an equipment clock, so that the clock quality selected becomes the quality of the equipment clock.

Packet format of PDU having stored therein the above SSM as OAM information is depicted in FIG. 6, where this example depicts PDU of SSM OAM defined by ITU-T G.8261 as depicted by the definition of the parameters in the following table 3:

TABLE 3

DEFINITION OF SSM OAM

| | Octets | CONTENTS | TRANSMISSION | RECEPRION |
|---|---|---|---|---|
| Destination Address | 6 | DA indicating OAM PDU | 01-80-c2-00-00-02 | Check DA to find OAM |
| Source Address | 6 | Output Source MAC address | MAC of its proper NE? MAC of its proper UNIT? MAC of its proper line? | Detect source MAC |
| OAM PDU Length/Type | 2 | TYPE indicating OAM PDU | Fixed to "88-09" | OAM PDU for 88-09 |
| OAM PDU Subtype | 1 | Subtype indicating OAM PDU | Fixed to "0x03" | OAM PDU for 0x03 |
| Flags | 2 | 15:7 Reserved | all '0' | Ignore |
| | | 6 Remote Stable | Transmit Local Stable received | Verify Discover state of its proper line |
| | | 5 Remote evaluating | Transmit Local Evaluating received | Verify Discover state of its proper line |
| | | 4 Local Stable | Transmit Discovery state of its proper line | Notify Discovery state on opposite side |
| | | 3 Local Evaluating | Transmit Discovery state of its proper line | Notify Discovery state on opposite side |
| | | 2 Critical Event | Transmit Critical Event (definition required) | Critical Event is generated on opposite side |
| | | 1 Dying Gasp | Transmit Unit Fail state | Notify Unit Fail on opposite side |
| | | 0 Link Fault | Transmit Link state | Notify Link Down on opposite side |
| Code | 1 | OAM PDU Code | FE | Organized OAM for FE |
| OUI | 3 | Being applied to IEEE | Provisionable (only initial setting) | SSM OAM for same value with setting value |
| SSM | 1 | B8-B5: Reserved | all '1' | Ignore |
| | | B4-B1: SSM | *In case its proper line is not selected, enter result with SSM selection logic *In case its proper line is selected, enter DNU (="1111") | Transmit to SYNC as received SSM |
| Reserved | 39 | Reserved byte | Embed with PAD | Ignore |
| FCS | 4 | Frame Check Sequence | Calculate & insert FCS | Check FCS |

TABLE 1-continued

| SSM CODE [MSB...LSB] | QUALITY LEVEL |
|---|---|
| 1100 | QL-INV12 |
| 1101 | QL-INV13 |
| 1110 | QL-INV14 |
| 1111 | QL-DNU |

The above SSM OAM PDU uses "Slow Protocol Frame" prescribed by IEEE802.3ah. Namely, the values of "Destination Address", "OAM PDU Length/Type", "OAM PDU Subtype", "Code" and "OUI" are fixed values. "Flags" is used for notifying "its proper line/its proper unit state" or "Discovery state". The SSM value at the time of transmission is inserted with the quality of the equipment clock ECL determined by the timing processor TC, which is transmitted to the SSM processor SP of the Ethernet unit EU through the serial bus SB from the timing processor TC. The SSM value at the time of reception indicates the clock quality of the line.

Summary of Receiving Operations of Ethernet Unit EU

1) Line Clock Extraction a. Line clock [125 MHz] is extracted at the physical layer processor PHY;
b. The line clock extracted is transferred to the reception clock converter RCC;
c. The reception clock converter RCC converts the clock of the Ethernet link or network to the clock of the SDH link or network having the frequency [19.44 MHz] with a synthesizer or the like. For example, a clock of the Ethernet link or network is 125 MHz, and the common line clock LCL is 19.44 MHz;
d. The common line clock LCL is transmitted to the timing processor TC, whereby the timing processor TC can achieve the synchronization function without considering the Ethernet link or network and the SDH link or network.

2) Receiving Packet Processing Function a. The packet processor PP identifies OAM packets to be sent to the OAM processor OP;
b. OAM PDU determination is made by using "DA", "OAM PDU Length/Type" and "OAM PDU Subtype";
c. "Code" and "OUI" are checked, where it is determined to be an SSM OAM in case "Code" is 0xFE and "OUI" is an expected value, thereby performing "SSM OAM" processing;
d. SSM value received is extracted from "SSM OAM". At this time, the reception protection is given, the received SSM value is updated only when having received the same value sequentially and the received SSM value is sent to the SSM processor SP. The above b-d are executed by the OAM processor OP;
e. The SSM processor SP performs "Assumed/Incoming" setting and "Assumed SSM" setting. In case of "Assumed" setting, the setting value is treated as the SSM value of the line regardless of the received value. In case of "Incoming" setting, the received value is used as it is;
f. The SSM value determined in the above e. is transferred to the timing processor TC through the serial bus SB. This serial bus SB is common to the Ethernet units EU and SDH units SU.

This enables a function equivalent to the SDH unit to be offered by the Ethernet unit. The SDH unit performs the same processing by using "S1 byte" of the overhead.

Summary of Transmitting Operations of Ethernet Unit EU

1) Transmission Clock Processing a. The transmission clock converter SCC receives the equipment clock ECL [38.88 MHz] from the timing processor TC;
b. Frequency conversion from the equipment clock ECL to the Ethernet clock is performed with a synthesizer or the like. For example, the equipment clock is 19.44 MHz and the Ethernet clock is 25 MHz;
c. By using the clock [25 MHz] after the frequency conversion, synchronization is made at the transmission clock synchronizer SCS;
d. The clock [125 MHz] after having been synchronized at the transmission clock synchronizer SCS is sent to the physical layer processor PHY and is supposed to be a transmission clock.

This enables a clock for SDH link or network (SDH type clock) to be converted into a clock for the Ethernet link or network (Ethernet type clock), enabling synchronization similar to the SDH link or network.

2) Transmission Packet Processing Function a. SSM of the equipment clock ECL is received by the SSM processor SP through the serial bus SB;
b. Processing such as compulsory rewriting, DNU controls etc. for the received SSM is performed;
c. The SSM after having been processed is sent to the OAM processor OP;
d. The OAM processor OP generates an SSM OAM packet periodically (1 packet/1 s) and sends it to the packet processor PP;
e. The packet processor PP transmits the OAM packet to the physical layer processor PHY together with the main signal packet, at which QoS controls etc. are made;
f. The physical layer processor PHY transmits the main signal packet to the interface portion IF by using the clock synchronized with the equipment clock ECL.

This enables the equipment clock ECL to be used as an output clock of the transmission packet, enabling a network synchronization by the receiving process.

This enables a function equivalent to the SDH unit to be offered for the Ethernet unit. The SDH unit performs the same processing by using "S1 byte" of the overhead.

Embodiment 2

FIGS. 7 and 8

While in the above embodiment [1], the Ethernet unit EU converts the clock of the Ethernet link or network to the clock of SDH link or network to be provided to the timing processor TC, in this embodiment [2] the Ethernet unit EU provides the clock of the Ethernet link or network to the timing processor TC without any conversion, different from the embodiment [1]. This embodiment [2] can be also applied to the network arrangements (1) and (2) respectively depicted in FIGS. 1 and 2.

Then, the timing processor TC makes the SSM processor SP determine the clock quality through the serial bus SB based on the line clock LCL provided from the units EU and SU, provides the clock of the Ethernet link or network to the Ethernet unit EU based on the clock of the best quality and provides the clock of the SDH link or network to the unit SU of the SDH link or network, different from the embodiment [1].

Namely, this embodiment [2] modifies the embodiment [1] in the following respects:

1) The timing processor TC prepares two kinds of clocks for the SDH link or network and for the Ethernet link or network;
2) The line clock to the timing processor TC is a common frequency, i.e. 8 kHz for the SDH type clock and the Ethernet type clock;
3) Both of the SDH type clock and the Ethernet type clock are distributed to the line interface units LIU;
4) The line interface units LIU do not make the frequency conversion, where the SDH unit employs the SDH type clock and the Ethernet unit employs the Ethernet type clock.

A clock transferring method between the line interface units LIU and the timing processor TC will now be described referring to FIGS. 7 and 8 as follows:

1) The Ethernet unit and the SDH unit respectively transmit the line clock to the timing processor TC. Between the Ethernet unit EU and the SDH unit SU, the destination and the line clock frequency are different. Namely, the timing processor TC receives the line clock LCL1 from the Ethernet unit EU and receives the line clock LCL2 from the SDH unit SU. Assuming that the frequency of the line clock LCL1 is 25 MHz and the frequency of the line clock LCL2 is 19.44 MHz for example, 25 MHz is 1/5 of 125 MHz that is the fundamental frequency of the Ethernet link or network and 19.44 MHz is 1/8 of 155.52 MHz;

2) In the timing processor TC, frequency dividers FD1 and FD3 frequency-divide the received clock from the Ethernet unit EU at a ratio of 1/n to assume 8 kHz, and frequency dividers FD6 and FD8 frequency-divide the clock from the SDH unit SU at a ratio of 1/m to assume 8 kHz. They are transferred to the clock selector CSL after having been selected by the selectors SEL1-SEL4. Assuming that the line clock LCL1 from the Ethernet unit EU is 25 MHz and the line clock LCL2 from the SDH unit SU is 19.44 MHz for example, "n" and "m" assume "3125" and "2430", respectively. In this example, frequency dividers FD2, FD4, FD5 and FD7 are not used;

3) Clocks to be selected by the clock selector CSL are transmitted through the serial bus SB (depicted by dotted lines). Based on the clocks determined according to the SSM, the Ethernet type clock is prepared at the phase locked loop portion PLL#1 and the SDH type clock is prepared at the phase locked loop portion PLL#2. These clocks are distributed to the units EU and SU as the equipment clock ECL. Namely, the Ethernet unit EU receives the equipment clock ECL1 from the phase locked loop portion PLL#1 and the SDH unit receives the equipment clock ECL2 from the phase locked loop portion PLL#2. Based on the equipment clocks ECL1 and ECL2, the units SU and EU prepare clocks. For example, the equipment clock ECL1 is made 25 MHz and the equipment clock ECL2 is made 38.88 MHz, enabling mutually independent clocks to be generated between the Ethernet unit EU and the SDH unit SU.

The reception packet processing and the transmission packet processing are the same as those in the embodiment [1]. Therefore, in each Ethernet unit EU, as depicted in FIG. 8, the reception clock converter and the transmission clock converter depicted in FIG. 5 are needless, so that the clock [125 MHz] extracted at the physical layer portion PHY is frequency-divided at a ratio of 1/5 by a frequency divider FD10 to be provided to the timing processor TC as a line clock [25 MHz] while the equipment clock [25 MHz] from the timing processor TC is provided to the transmission clock synchronizer SCS without change, different from the embodiment [1].

Embodiment 3

FIGS. 9 and 10

While in the above embodiments [1] and [2] the case where the network equipment is set on the border between the SDH link and the Ethernet link has been described, this embodiment [3] can be further applied to a case where the Ethernet unit is set only in the Ethernet link EL as depicted in a network arrangement (3) in FIG. 9. Namely, as aforementioned regarding the related art, Ethernet links or networks are operated with mutually independent clocks, whereas this embodiment [3] synchronizes them in a more flexible manner.

One embodiment of such a network equipment is depicted in FIG. 10. This network equipment NE is different from the network equipment NE applied to the embodiments [1] and [2] depicted in FIG. 3 in that the Ethernet unit EU is substituted for the SDH unit, so that all of the line interface units LIU are composed of the Ethernet units EU#1-EU#4 (hereinafter, generally referred to as a reference symbol EU).

The connection between the units EU and the timing processor TU is the same as the case depicted in FIG. 3, where the Ethernet link EL depicted in FIG. 9 requires a master clock, for which purpose the master clock PRC [2.048 MHz] is supplied to the timing processors TC (W) and TC (P), different from the above embodiments.

Operation of Network Equipment NE13

1. It is assumed that the timing processor TC determines the clock quality from the master clock TRC to be the best;
2. The timing processor TC synchronizes the phase locked loop portions PLL#1 and PLL#3 with the clock from the master clock TRC to generate the equipment clock ECL [38.88 MHz];
3. The timing processor TC transfers the equipment clock ECL to all of the Ethernet units EU and the packet switches SW;
4. Each Ethernet unit EU outputs a receiving side main signal synchronized with the equipment clock ECL.

Common Operation of Network Equipments NE14, NE15 and NE16

1. The Ethernet unit EU#1 extracts the received clock, converts it to a clock [19.44 MHz] of the frequency of the line clock LCL and transfers it to the timing processor TC, where it is assumed that the timing processor TC determines the clock quality of the Ethernet unit EU#1 to be the best;
2. The timing processor TC generates the equipment clock ECL [38.88 MHz] synchronized with the clock from the Ethernet unit EU#1;
3. The timing processor TC transfers the equipment clock ECL to all of the Ethernet units EU and the packet switches SW;
4. Each Ethernet unit EU converts the equipment clock ECL to a clock of the frequency of the line clock LCL and outputs a transmitting side main signal synchronized therewith.

It is also to be noted that the present invention is not limited by the above-mentioned embodiments, and it is obvious that various modifications may be made by one skilled in the art based on the recitation of the claims.

DESCRIPTION OF REFERENCE NUMERALS OR SYMBOLS

Figure 1:
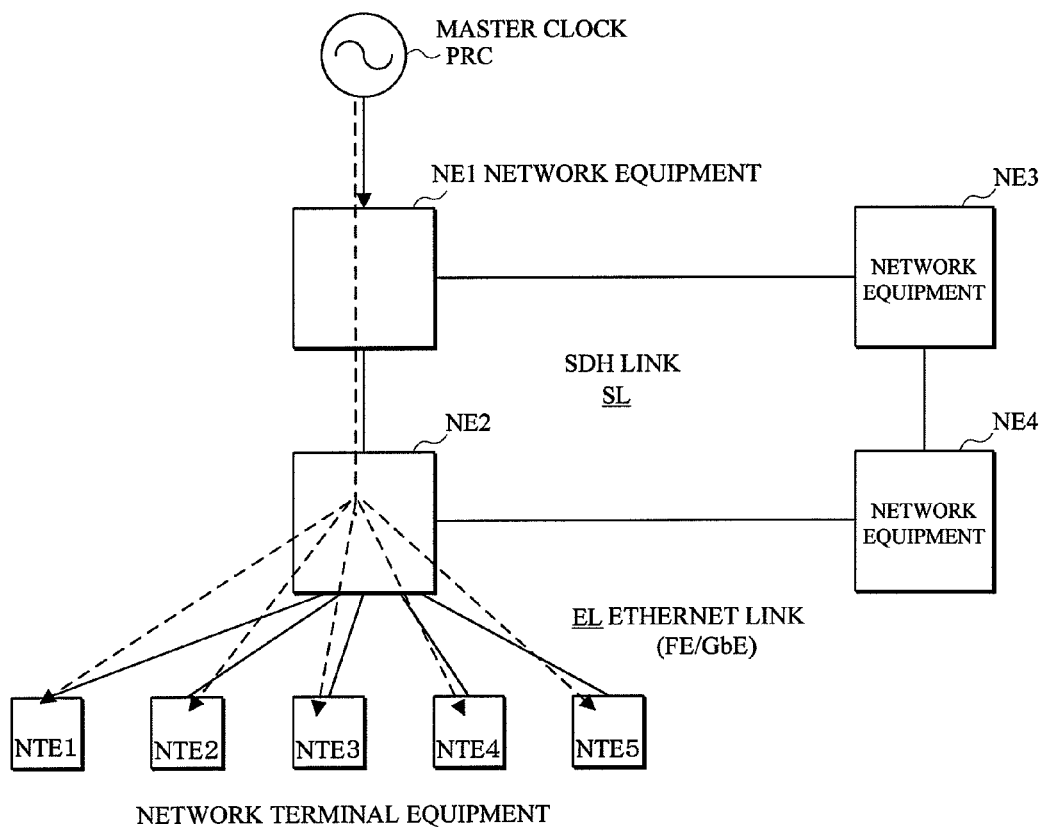
FIG. 1 is a block diagram depicting a network arrangement (1) where a network equipment according to the present invention is applied.
Figure 2:
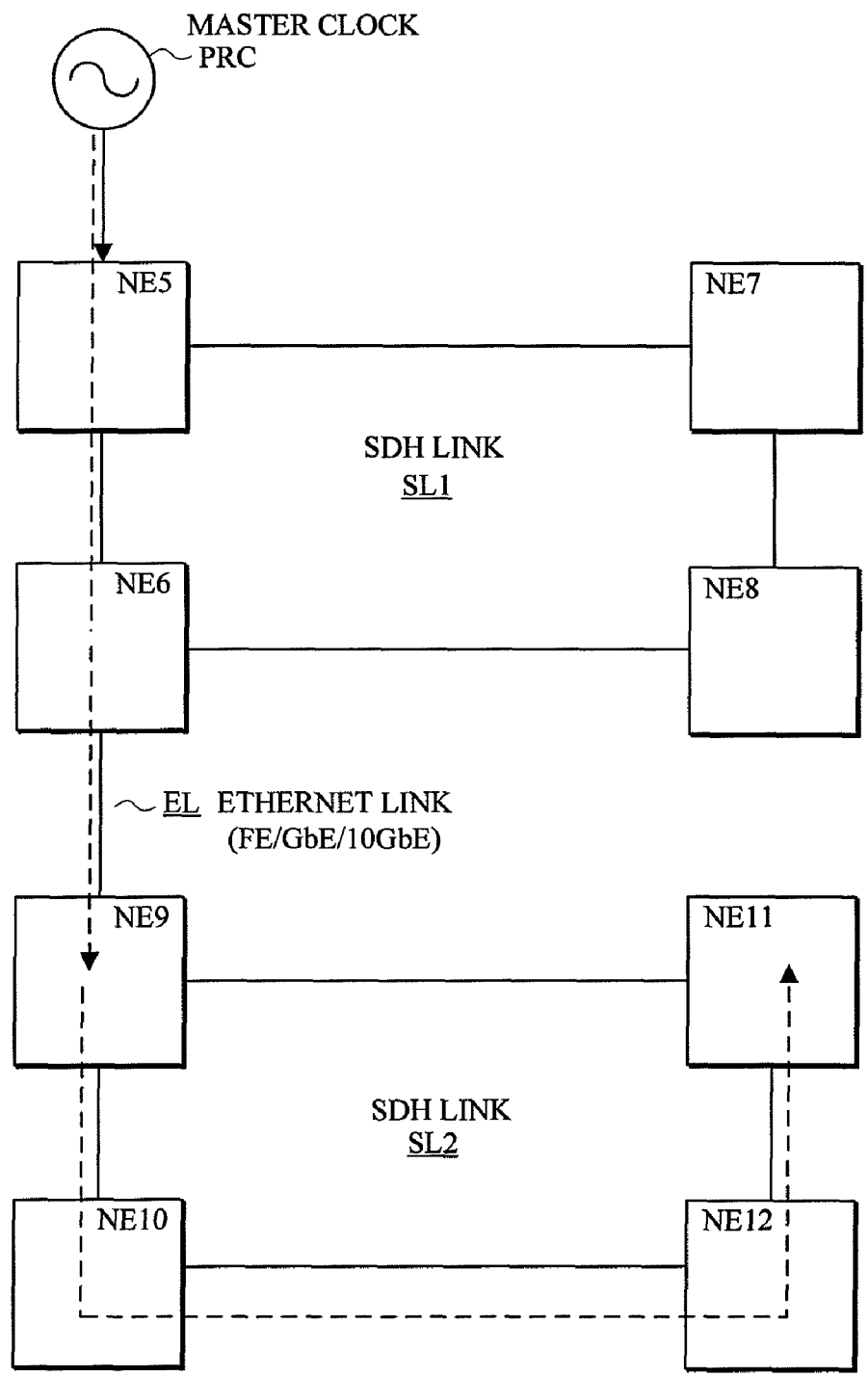
FIG. 2 is a block diagram depicting a network arrangement (2) where a network equipment according to the present invention is applied.
Figure 3:
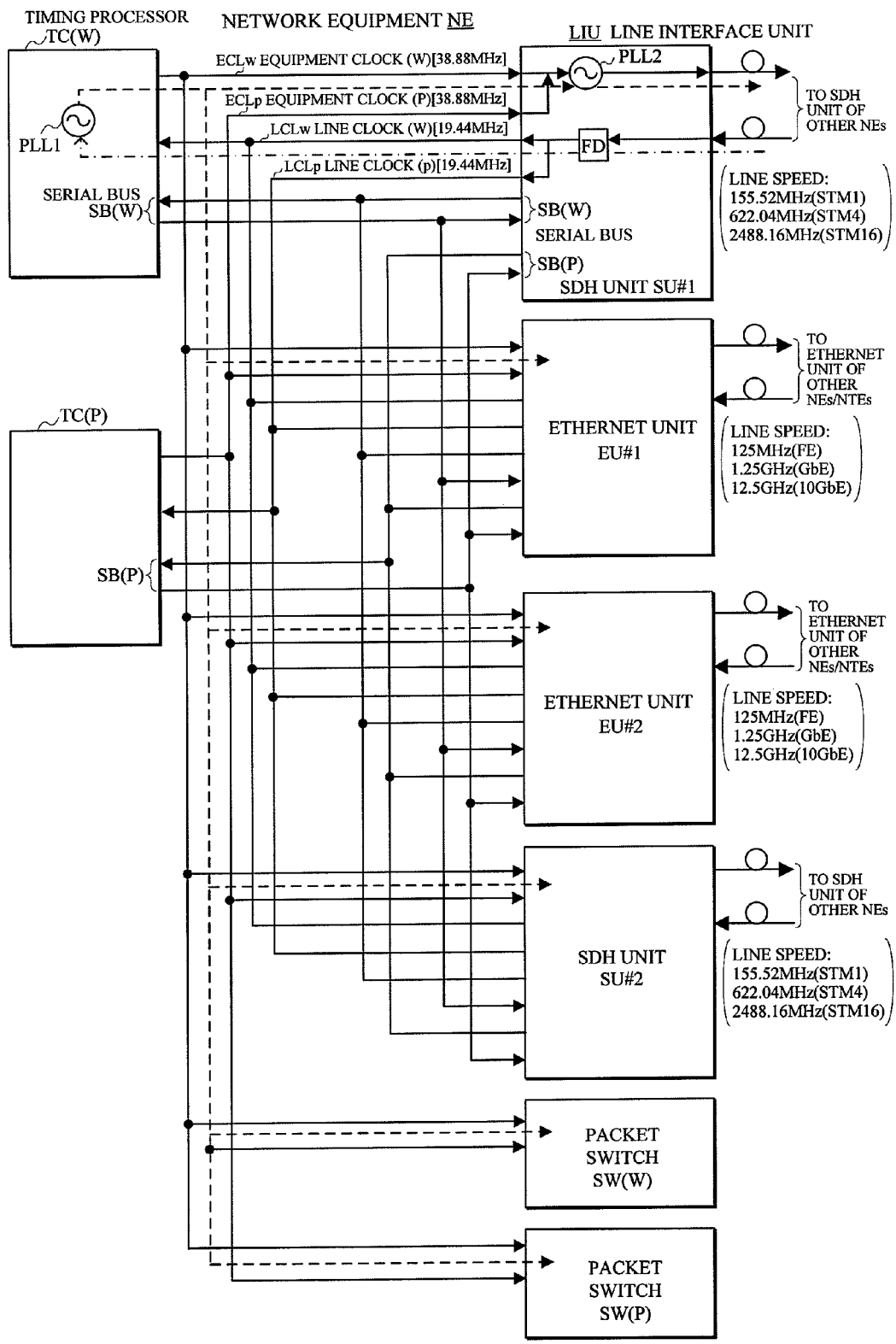
FIG. 3 is a block diagram depicting an arrangement of embodiments [1] and [2] of the network equipment according to the present invention.
Figure 4:
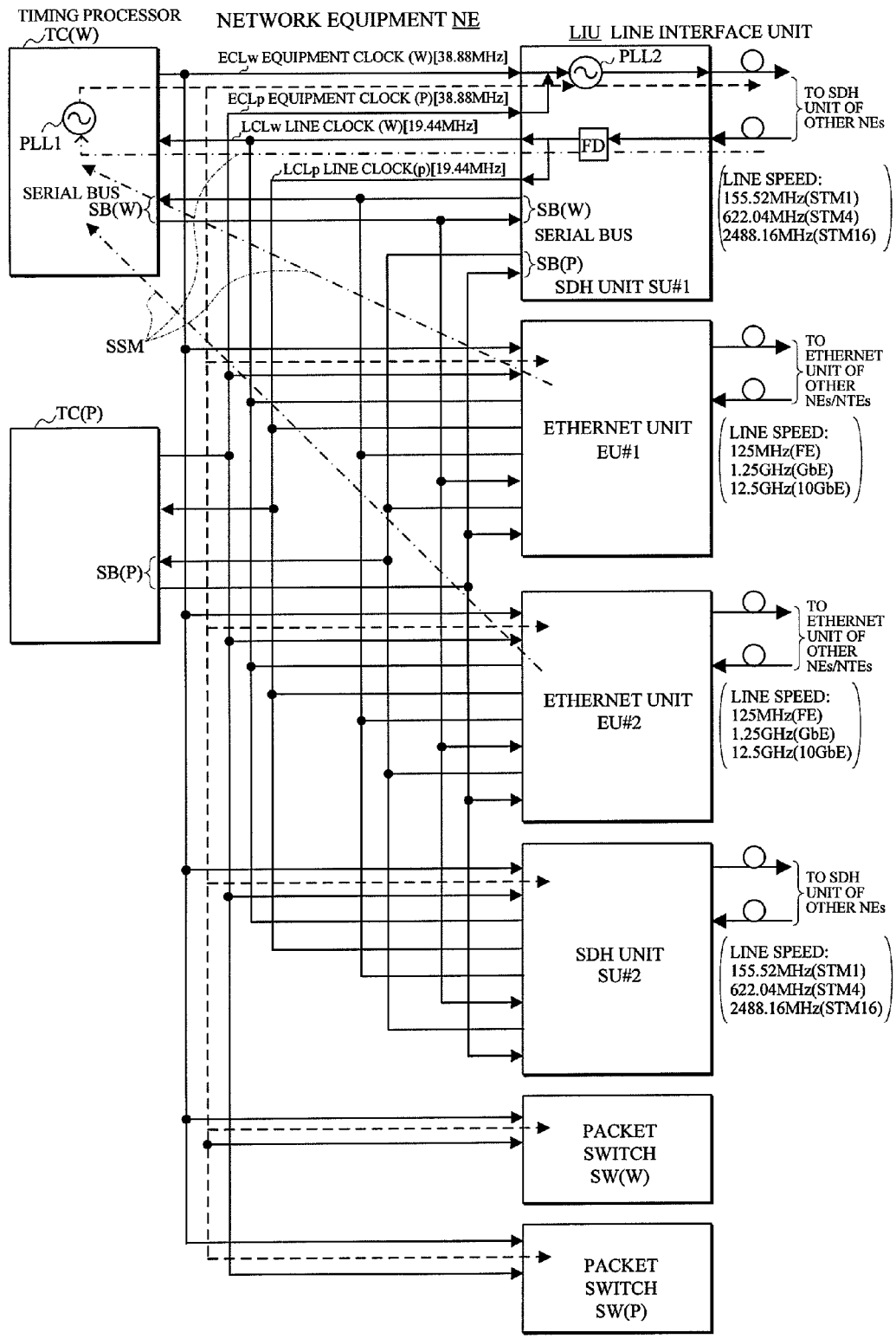
FIG. 4 is a block diagram explaining a schematic operation of the network equipment according to the present invention.
Figure 5:
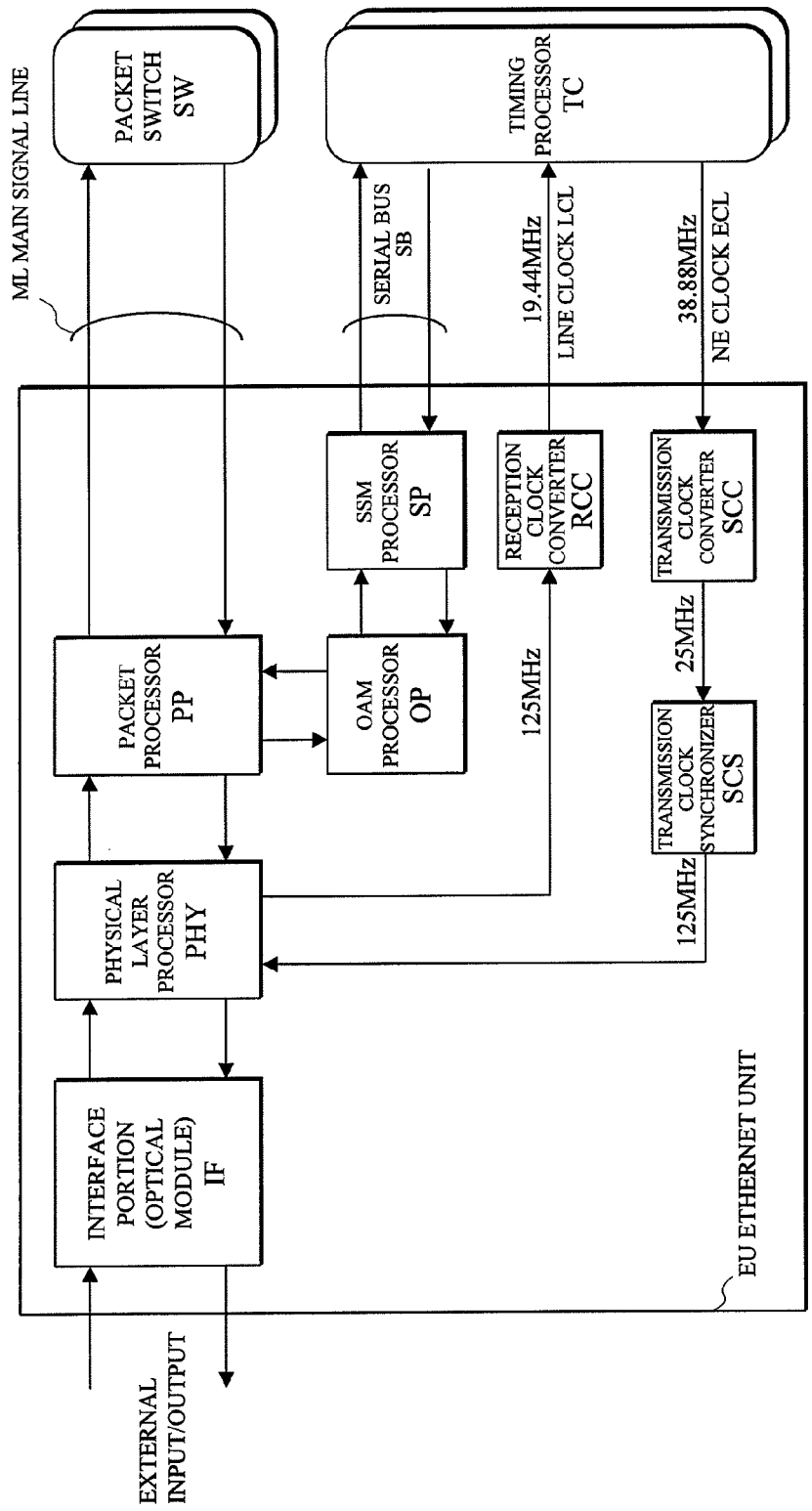
FIG. 5 is a block diagram depicting an arrangement of an Ethernet unit used in embodiments [1] and [3] of the network equipment according to the present invention.
Figure 6:
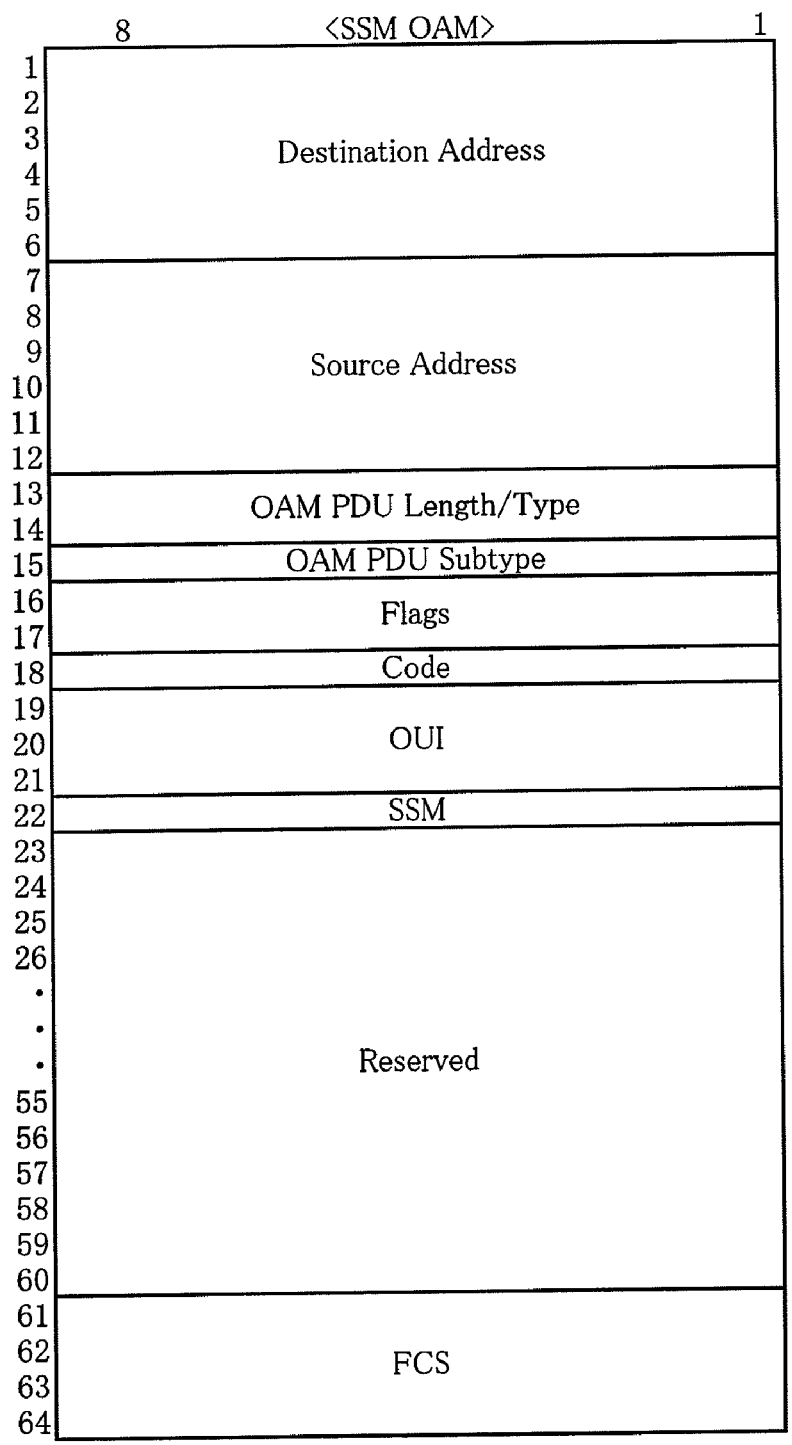
FIG. 6 is a diagram depicting a packet format of PDU including SSM OSM used in the network equipment according to the present invention.
Figure 7:
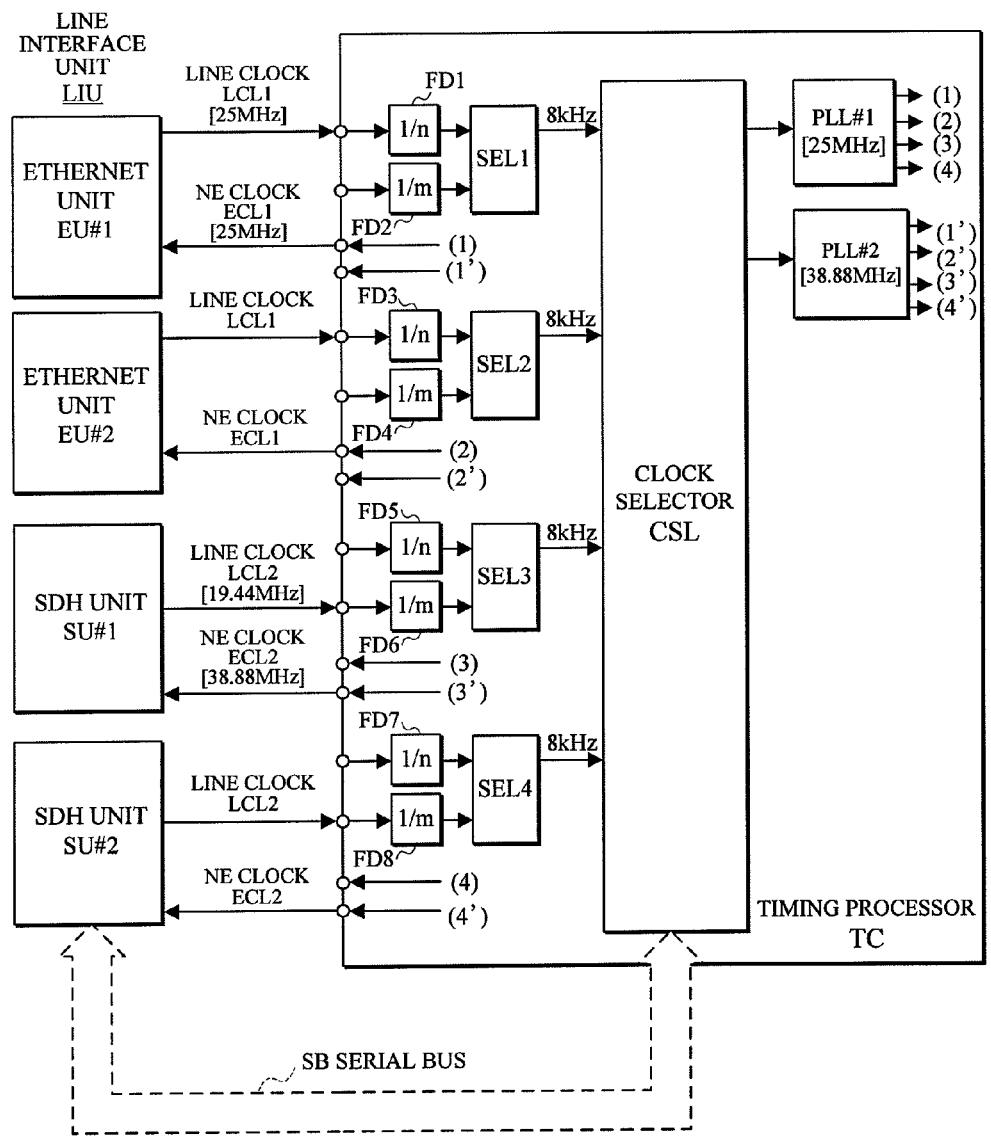
FIG. 7 is a block diagram depicting the embodiment [2] of the network equipment according to the present invention.
Figure 8:
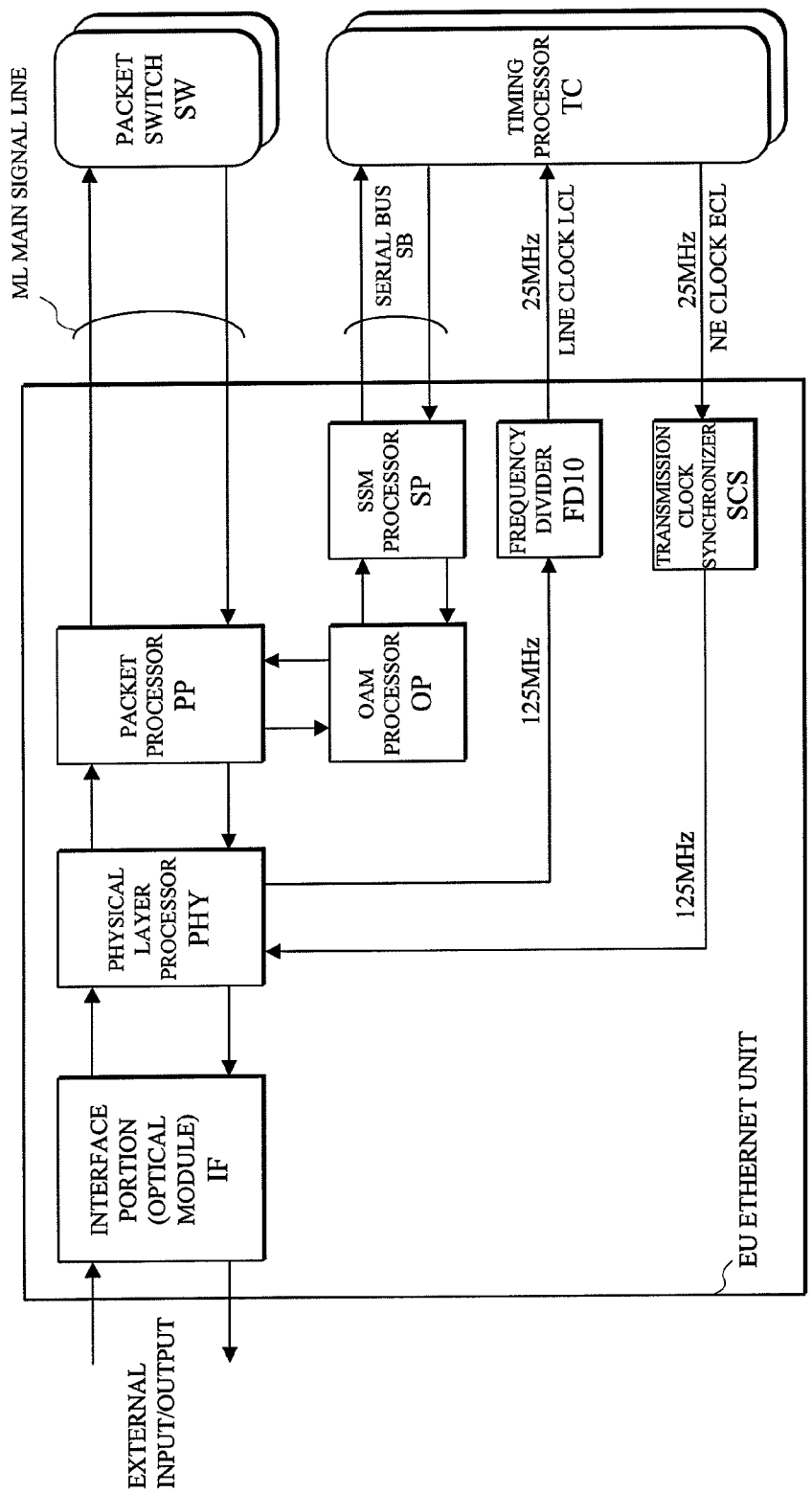
FIG. 8 is a block diagram depicting an arrangement of the Ethernet unit depicted in FIG. 7.
Figure 9:
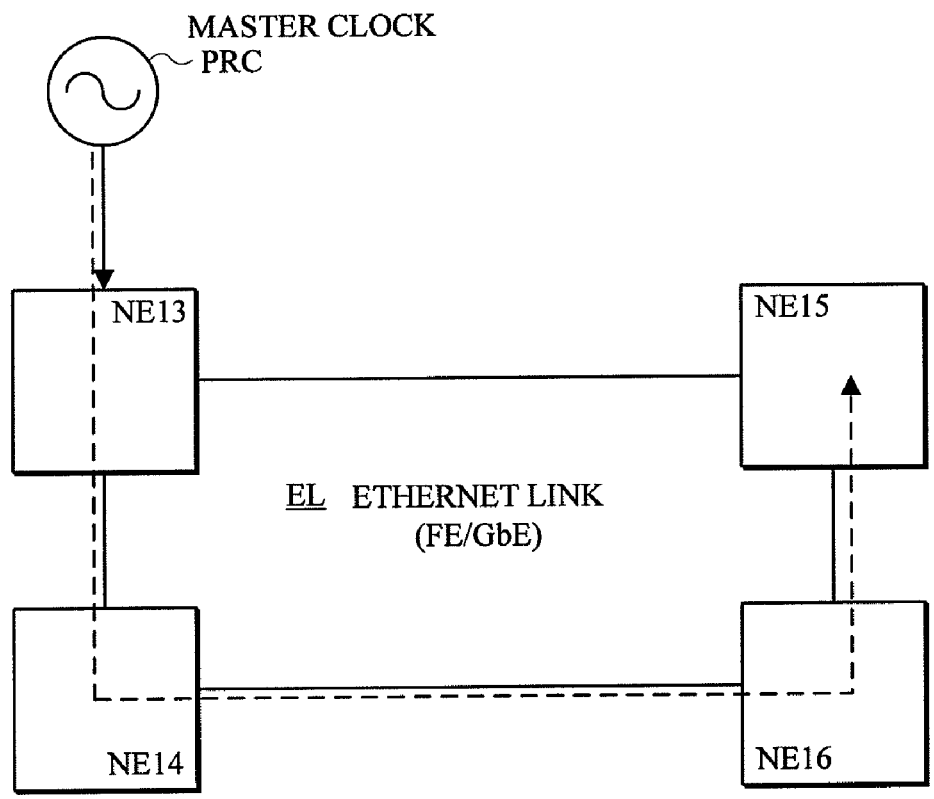
FIG. 9 is a block diagram depicting a network arrangement (3) where a network equipment according to the present invention is applied.
Figure 10:
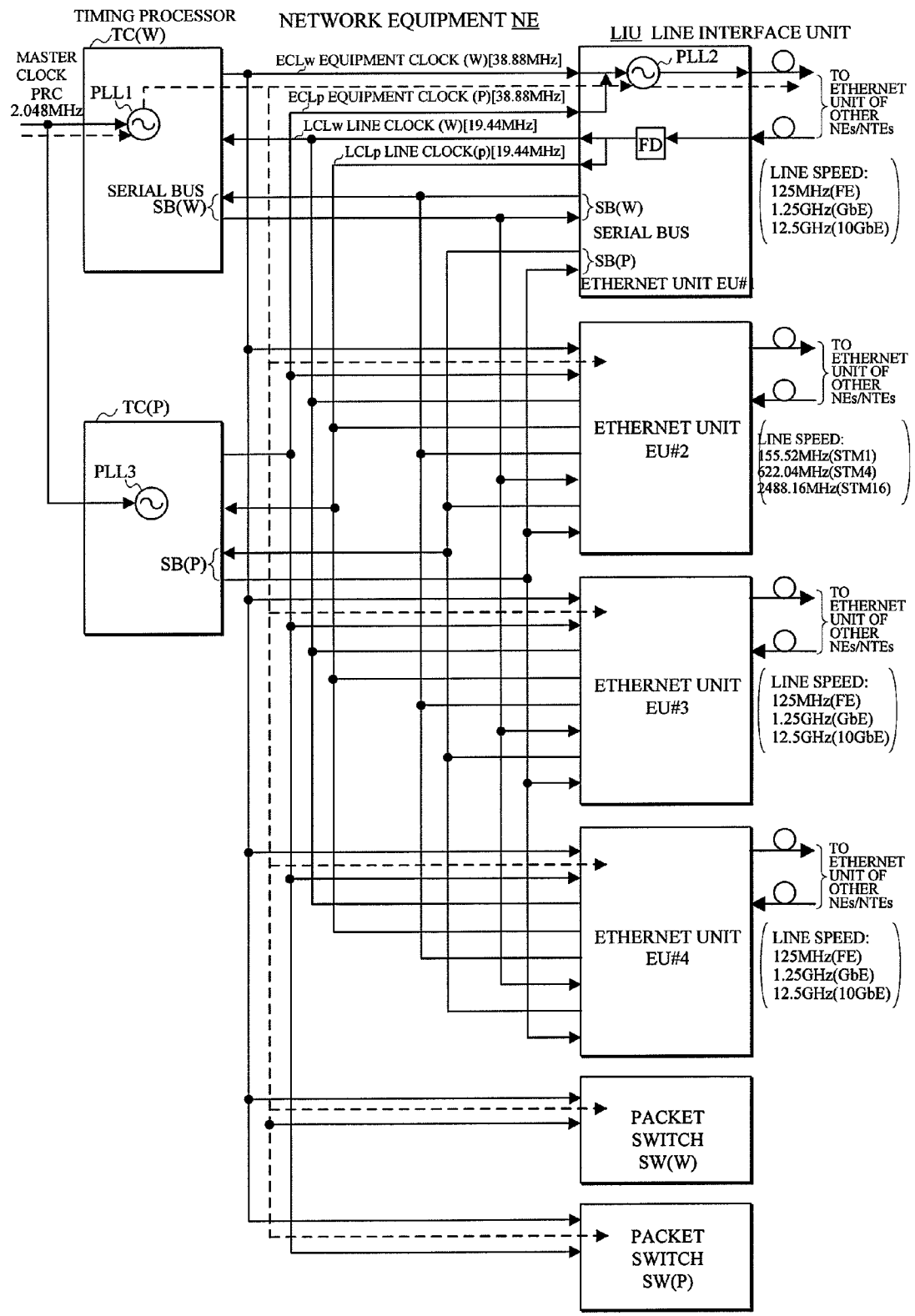
FIG. 10 is a block diagram depicting an arrangement of the network equipment according to the present invention applied to the network arrangement (3) depicted in FIG. 9.
Figure 11:
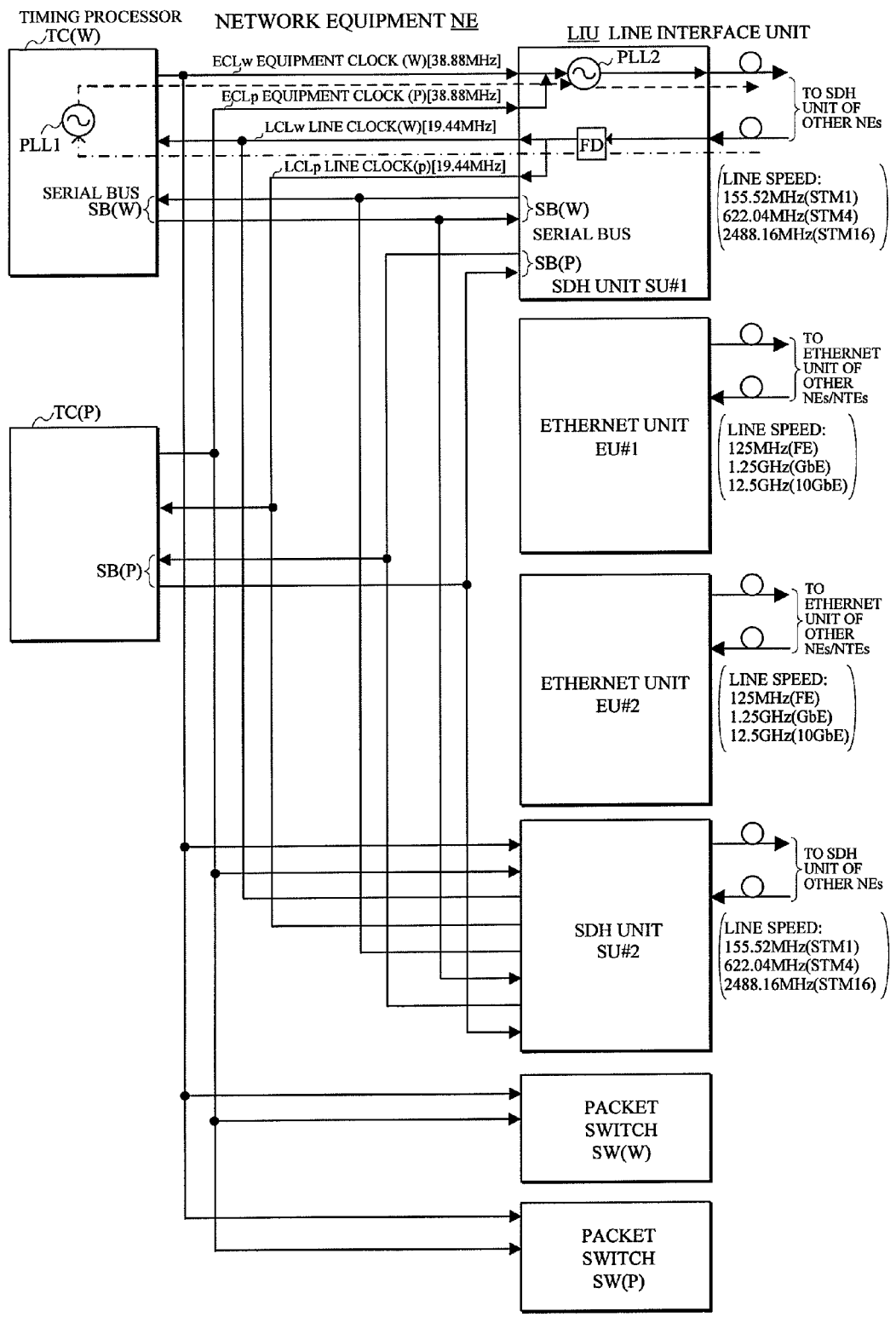
FIG. 11 is a block diagram depicting an arrangement of a related art network equipment.
Figure 12:
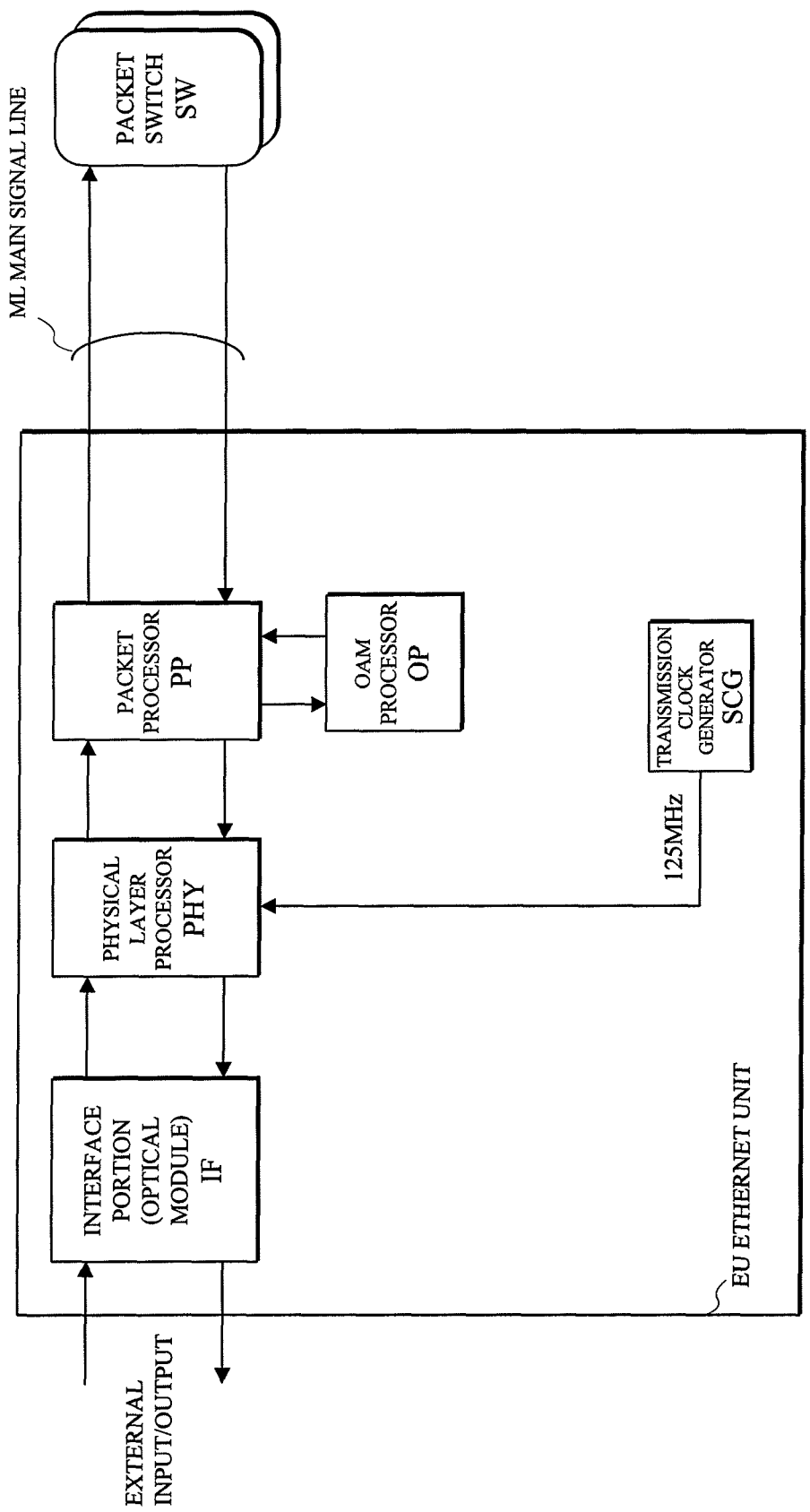
FIG. 12 is a block diagram depicting an arrangement of an Ethernet unit depicted in FIG. 11.

NE1-NE12 Network equipment (element)
NTE1-NTE5 Network terminal equipment
PRC Master clock
SL, SL1, SL2 SDH link
PLL1-PLL3 Phase locked loop portion
EL Ethernet link
LIU Line interface unit
FD, FD1-FD8, FD10 Frequency divider
SEL1-SEL4 Selector
CSL Clock selector
TC(W), TC(P) Timing processor
ECLw, ECLp Equipment clock
LCLw, LCLp Line clock
SU#1, SU#2 SDH unit
EU#1-EU#4 Ethernet unit
SW(W), SW(P) Packet switch
SB(W), SB(P) Serial bus
IF Interface portion
PHY Physical layer processor
PP Packet processor
OP OAM processor
SP SSM processor
SCC Transmission clock converter
SCS Transmission clock synchronizer Throughout the figures, the same reference numerals or symbols indicate the same or corresponding parts.

The invention claimed is:

1. A network equipment comprising:
   at least one first circuit, electrically coupled to an SDH (Synchronous Digital Hierarchy) link or SONET (Synchronous Optical NETwork) link, extracting and outputting a first line clock synchronized with a received signal;
   at least one second circuit, electrically coupled to an Ethernet link, extracting a second line clock synchronized with a received signal and converting the second line clock into a clock of a frequency of the first line clock to be outputted; and
   a third circuit receiving the clocks of the frequency of the first line clock from the first and the second circuits, selecting among the clocks a clock of the best quality and outputting an equipment clock synchronized with the clock selected;
      wherein the first circuit outputs a transmission signal synchronized with the equipment clock and the second circuit converts the equipment clock into a clock of a frequency of the second line clock to output a transmission signal synchronized with the clock converted.

2. A network equipment comprising:
   at least one first circuit, electrically coupled to an SDH link or SONET link, extracting and outputting a first line clock synchronized with a received signal;
   at least one second circuit, electrically coupled to an Ethernet link, extracting and outputting a second line clock synchronized with a received signal; and
   a third circuit receiving the first and the second line clocks respectively from the first and the second circuits, selecting among the line clocks a clock of the best quality and outputting a first and a second equipment clock synchronized with the clock selected;
      wherein the first circuit outputs a transmission signal synchronized with the first equipment clock and the second circuit outputs a transmission signal synchronized with the second equipment clock; and
      the third circuit frequency dividing the first and the second line clocks into a clock of a common frequency and then selects the clock of the best quality.

3. The network equipment as claimed in claim 1, wherein the first and the second circuits extract SSM (Synchronization Status Message) from the received signal to be transmitted to the third circuit, the third circuit selecting the clock of the best quality based on the SSM.

4. The network equipment as claimed in claim 1, wherein the first and the second circuits respectively comprise an SDH circuit and an Ethernet circuit electrically coupled one on one to a circuit opposed through each link and the third circuit comprises a timing processor.

5. The network equipment as claimed in claim 2, wherein the first and the second circuits extract SSM from the received signal to be transmitted to the third circuit, the third circuit selecting the clock of the best quality based on the SSM.

6. The network equipment as claimed in claim 2, wherein the first and the second circuits respectively comprise an SDH circuit and an Ethernet circuit electrically coupled one on one to a circuit opposed through each link and the third circuit comprises a timing processor.

7. The network equipment as claimed in claim 2, wherein the first line clock comprises a line clock extracted from the received signal or a clock obtained by frequency-dividing the line clock extracted.

8. A control method of a network equipment comprising:
   extracting and outputting a first line clock synchronized with a received signal, by at least one first circuit electrically coupled to an SDH (Synchronous Digital Hierarchy) link or SONET (Synchronous Optical NETwork) link;
   extracting a second line clock synchronized with a received signal and converting the second line clock into a clock of a frequency of the first line clock to be outputted, by at least one second circuit electrically coupled to an Ethernet link; and
   receiving the clocks of the frequency of the first line clock from the first and the second circuits, selecting among the clocks a clock of the best quality and outputting an equipment clock synchronized with the clock selected, by a third circuit;
      wherein the first circuit outputs a transmission signal synchronized with the equipment clock and the second circuit converts the equipment clock into a clock of a frequency of the second line clock to output a transmission signal synchronized with the clock converted.

* * * * *